US012640846B2

(12) United States Patent
Liu

(10) Patent No.: US 12,640,846 B2
(45) Date of Patent: May 26, 2026

(54) METHODS AND DEVICES FOR JOINT CODING AND DETERMINING IN-EFFECT REFERENCE SIGNAL RESOURCES

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 302 days.

(21) Appl. No.: 18/558,719

(22) PCT Filed: May 8, 2021

(86) PCT No.: PCT/CN2021/092417
§ 371 (c)(1),
(2) Date: Nov. 2, 2023

(87) PCT Pub. No.: WO2022/236481
PCT Pub. Date: Nov. 17, 2022

(65) Prior Publication Data
US 2024/0243844 A1     Jul. 18, 2024

(51) Int. Cl.
*H04L 1/00*          (2006.01)
*H04L 1/1607*      (2023.01)
(Continued)

(52) U.S. Cl.
CPC .......... *H04L 1/0076* (2013.01); *H04L 1/1614* (2013.01); *H04L 5/0048* (2013.01); *H04W 76/20* (2018.02)

(58) Field of Classification Search
None
See application file for complete search history.

(56) References Cited

U.S. PATENT DOCUMENTS

2017/0033904 A1*  2/2017  Stirling-Gallacher ....................... H04W 72/20
2020/0112964 A1*  4/2020  Yang ..................... H04W 72/51
(Continued)

FOREIGN PATENT DOCUMENTS

CN      102598573 B      4/2015
CN      106301505 A      1/2017
(Continued)

OTHER PUBLICATIONS

"Discussion on rate matching," Proceedings of the 3GPP TSG RAN WG1 NR Ad-Hoc#2, LG Electronics, R1-1710280, Jun. 27, 2017, Qingdao, People's Republic of China, 4 pages.

*Primary Examiner* — Brandon M Renner
(74) *Attorney, Agent, or Firm* — McCoy Russell LLP

(57) ABSTRACT

Provided are methods and devices for joint coding and determining in-effect reference signal resources. The method for joint coding comprises: determining a first coding value by joint coding on a first indication information, wherein the first indication information is used for indicating in-effect reference signal resources and whether the in-effect reference signal resources are available or unavailable to at least one first beam; and sending the first coding value. By means of joint coding, signaling resource overhead is reduced, and indication efficiency of in-effect reference signal resources and whether the in-effect reference signal resources are available to a beam are improved. In particular, when in-effect reference signal resources are all available to at least one first beam, sending a bitmap used for indicating whether the in-effect reference signal resources are available to each first beam can be avoided, and resource overhead can be further lowered.

18 Claims, 7 Drawing Sheets

(51) Int. Cl.
    *H04L 5/00*   (2006.01)
    *H04W 76/20*   (2018.01)

(56)      References Cited

U.S. PATENT DOCUMENTS

2022/0039115 A1 * 2/2022 Sun ....................... H04W 72/54
2023/0217265 A1 * 7/2023 Huang ................ H04B 7/0617
                370/329

FOREIGN PATENT DOCUMENTS

| | | | |
|---|---|---|---|
| CN | 108111253 | A | 6/2018 |
| CN | 111164905 | A | 5/2020 |
| JP | 2019533331 | A | 11/2019 |
| WO | 2011053997 | A2 | 5/2011 |

* cited by examiner

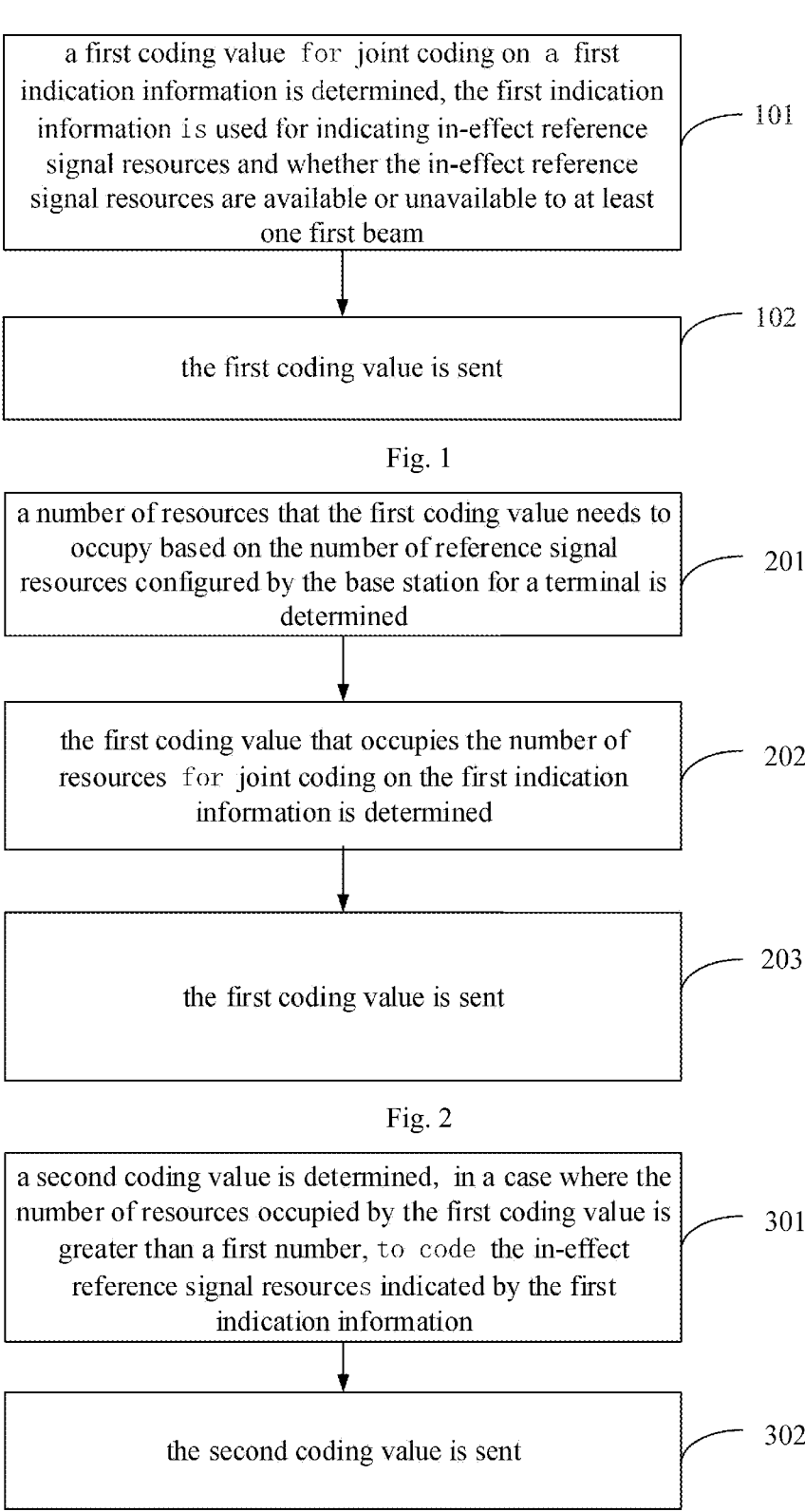

a first coding value for joint coding on a first indication information is determined, the first indication information is used for indicating in-effect reference signal resources and whether the in-effect reference signal resources are available or unavailable to at least one first beam — 101 the first coding value is sent — 102

Fig. 1 a number of resources that the first coding value needs to occupy based on the number of reference signal resources configured by the base station for a terminal is determined — 201 the first coding value that occupies the number of resources for joint coding on the first indication information is determined — 202 the first coding value is sent — 203

Fig. 2 a second coding value is determined, in a case where the number of resources occupied by the first coding value is greater than a first number, to code the in-effect reference signal resources indicated by the first indication information — 301 the second coding value is sent — 302

Fig. 3

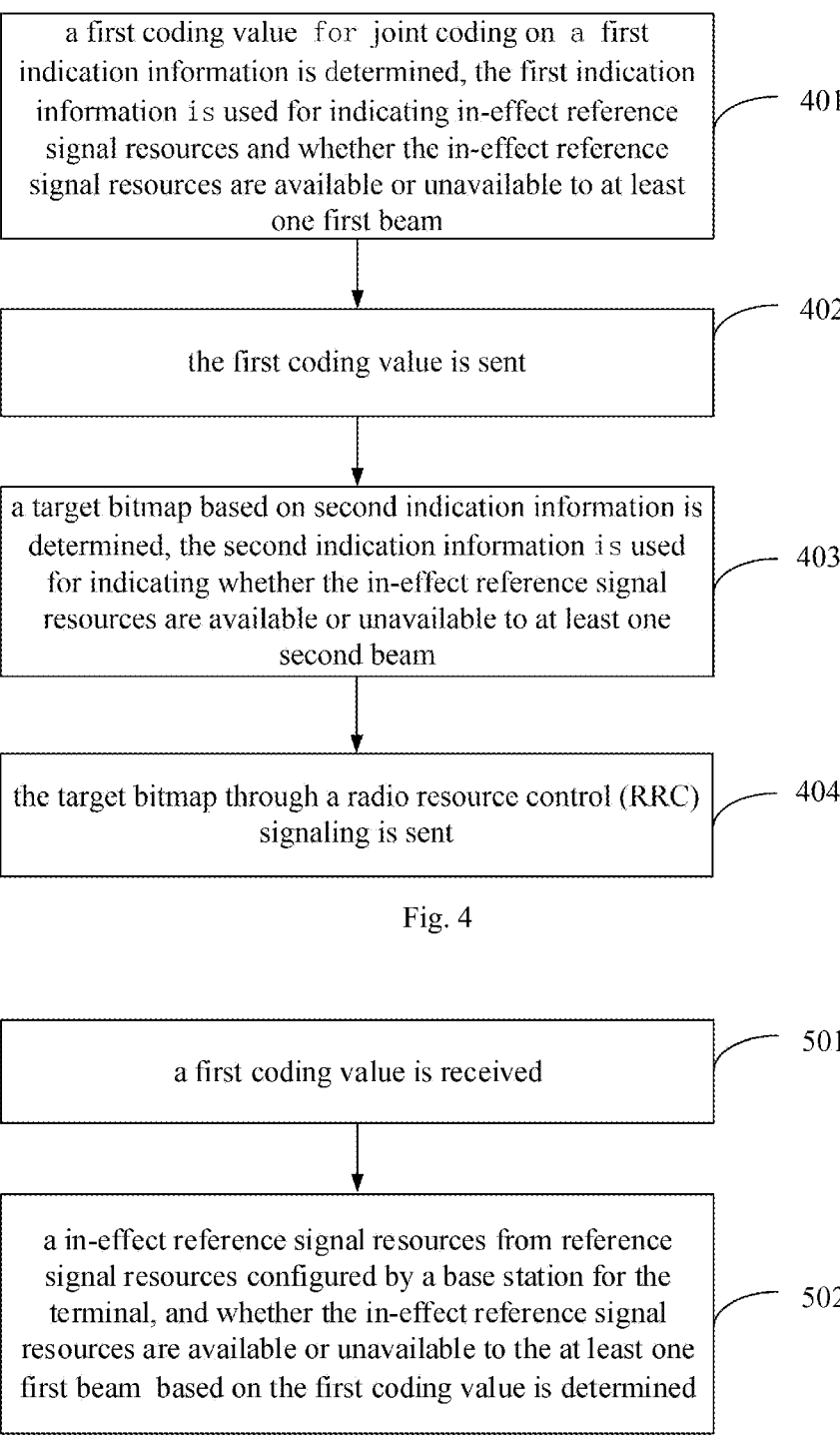

a first coding value for joint coding on a first indication information is determined, the first indication information is used for indicating in-effect reference signal resources and whether the in-effect reference signal resources are available or unavailable to at least one first beam — 401 the first coding value is sent — 402 a target bitmap based on second indication information is determined, the second indication information is used for indicating whether the in-effect reference signal resources are available or unavailable to at least one second beam — 403 the target bitmap through a radio resource control (RRC) signaling is sent — 404

Fig. 4 a first coding value is received — 501 a in-effect reference signal resources from reference signal resources configured by a base station for the terminal, and whether the in-effect reference signal resources are available or unavailable to the at least one first beam based on the first coding value is determined — 502

Fig. 5

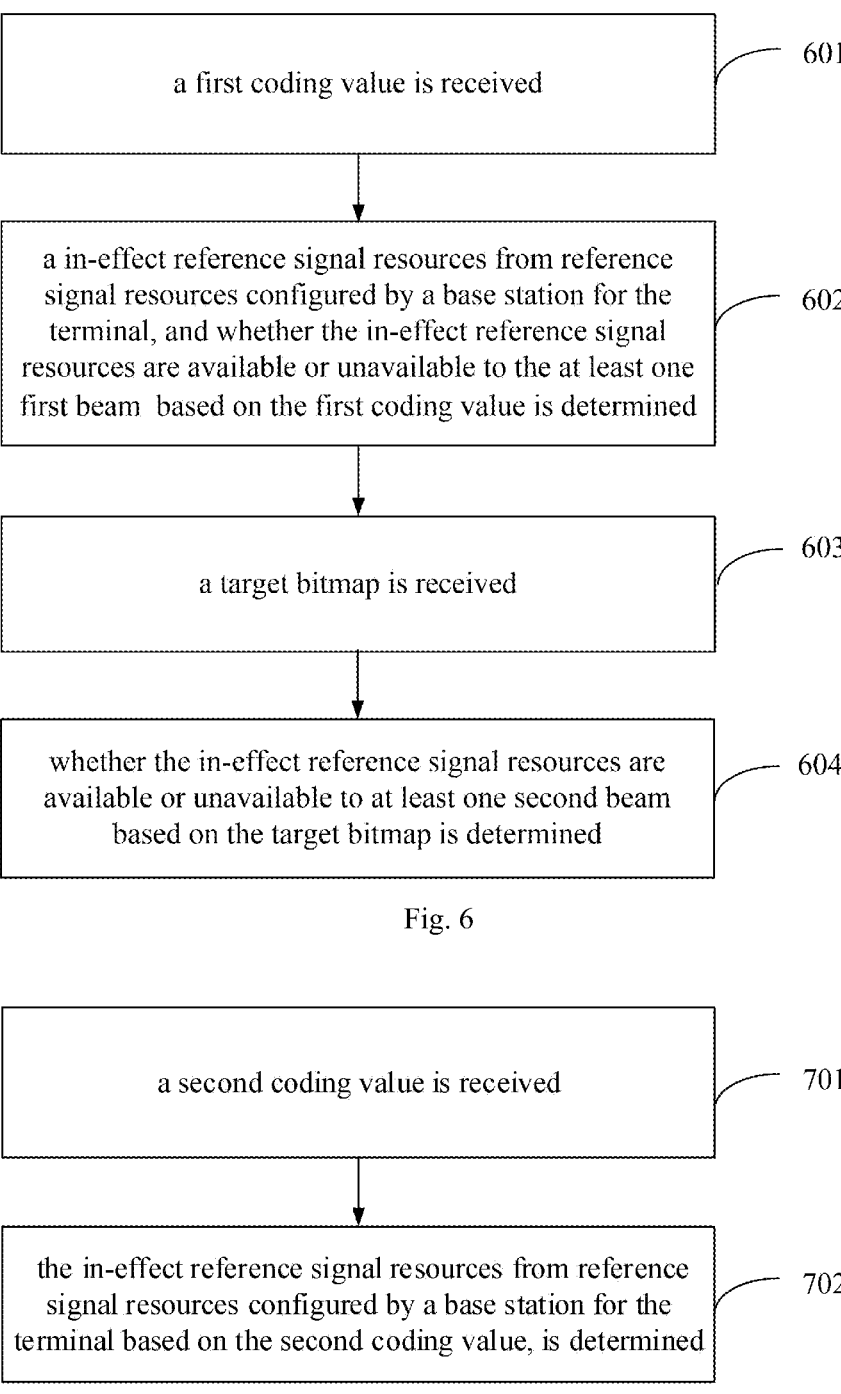

a first coding value is received — 601 a in-effect reference signal resources from reference signal resources configured by a base station for the terminal, and whether the in-effect reference signal resources are available or unavailable to the at least one first beam based on the first coding value is determined — 602 a target bitmap is received — 603 whether the in-effect reference signal resources are available or unavailable to at least one second beam based on the target bitmap is determined — 604

Fig. 6 a second coding value is received — 701 the in-effect reference signal resources from reference signal resources configured by a base station for the terminal based on the second coding value, is determined — 702

Fig. 7

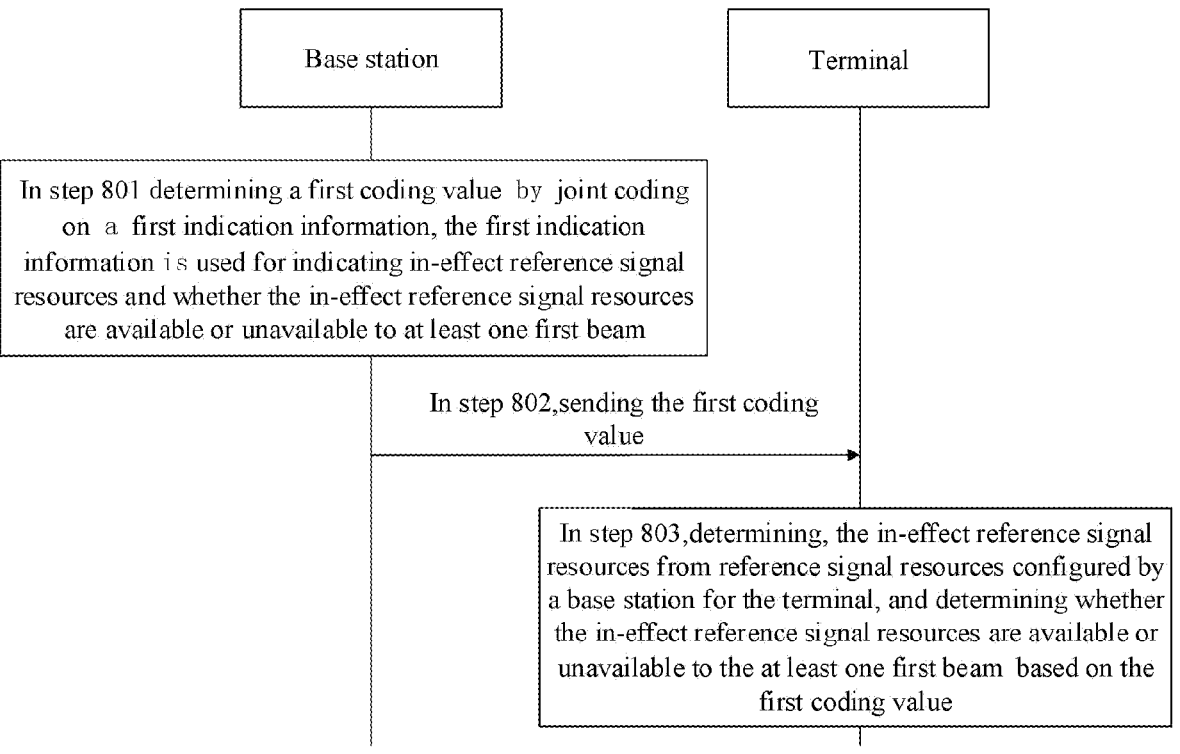

| Base station | Terminal |
|---|---|

In step 801 determining a first coding value by joint coding on a first indication information, the first indication information is used for indicating in-effect reference signal resources and whether the in-effect reference signal resources are available or unavailable to at least one first beam In step 802,sending the first coding value In step 803,determining, the in-effect reference signal resources from reference signal resources configured by a base station for the terminal, and determining whether the in-effect reference signal resources are available or unavailable to the at least one first beam based on the first coding value

Fig. 8

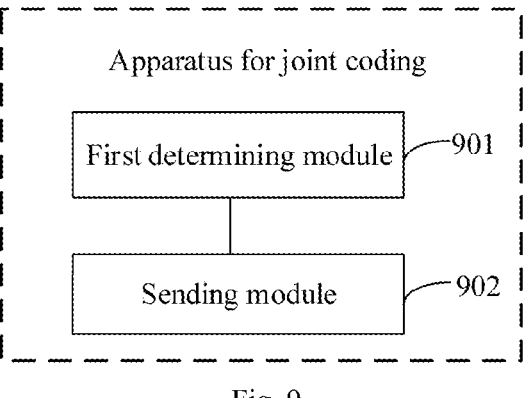

Apparatus for joint coding

First determining module — 901

Sending module — 902

Fig. 9

METHODS AND DEVICES FOR JOINT CODING AND DETERMINING IN-EFFECT REFERENCE SIGNAL RESOURCES

CROSS REFERENCE TO RELATED APPLICATION

The present application is a U.S. National Phase of International Application No. PCT/CN2021/092417 entitled "METHODS FOR JOINT CODING AND DETERMINATION OF IN-EFFECT REFERENCE SIGNAL RESOURCES, AND APPARATUS," and filed on May 8, 2021. The entire contents of the above-listed application are hereby incorporated by reference for all purposes.

BACKGROUND

At present, the following solutions may be adopted indicate whether tracking reference signal (TRS) resources or channel state information-reference signal (CSI-RS) resources are in effect for a terminal in an idle or inactive state through physical layer in-effect indication information:

the first solution is to indicate that all or part of configured reference signal resources are in effect or not in effect through in-effect indication information or not-in-effect indication information. For example, it may be indicated in a mode of a bitmap.

The second solution is to indicate in-effect reference signal resources through one or more resource/configuration index values or code points.

SUMMARY

In order to solve problems existing in the related art, examples of the disclosure provide methods and apparatuses for joint coding and determining in-effect reference signal resources.

According to a first aspect of an example of the disclosure, a method for joint coding is provided, and the method is performed by a base station, and includes:

determining a first coding value by performing joint coding on a first indication information, the first indication information is used for indicating in-effect reference signal resources and whether the in-effect reference signal resources are available or unavailable to at least one first beam; and sending the first coding value.

According to a second aspect of an example of the disclosure, a method for determining in-effect reference signal resources is provided, and the method is performed by a terminal, and includes:

receiving a first coding value, the first coding value is a coding value determined by joint coding on first indication information, and the first indication information is used for indicating in-effect reference signal resources and whether the in-effect reference signal resources are available or unavailable to at least one first beam;

determining, the in-effect reference signal resources from reference signal resources configured by a base station for the terminal, and determining whether the in-effect reference signal resources are available or unavailable to the at least one first beam based on the first coding value.

According to a third aspect of an example of the disclosure, a method for determination of in-effect reference signal resources is provided, and the method is performed by a terminal, and includes:

receiving a second coding value, the second coding value is a coding value determined by coding in-effect reference signal resources indicated by first indication information, and the first indication information is used for indicating the in-effect reference signal resources and whether the in-effect reference signal resources are available or unavailable to at least one first beam;

determining, based on the second coding value, the in-effect reference signal resources from reference signal resources configured by a base station for the terminal.

According to a fourth aspect of an example of the disclosure, A base station for joint coding is provided, including:

a processor; and a memory for storing executable instructions of the processor, where the processor is configured to execute the method for joint coding described in any one above.

According to an fifth aspect of an example of the disclosure, A terminal for determination of in-effect reference signal resources is provided, including:

a processor; and a memory for storing executable instructions of the processor, where the processor is configured to execute the method for determination of the in-effect reference signal resources described in any one above.

The technical solutions provided by the examples of the disclosure may include the following beneficial effects:

It is to be understood that the above general description and the following detailed description are merely for example and explanatory, and cannot limit the disclosure.

BRIEF DESCRIPTION OF THE DRAWINGS

The accompanying drawings here, which are incorporated in and constitute a part of this specification, illustrate examples consistent with the disclosure and together with the specification serve to explain the principles of the disclosure.

FIG. 1 is a schematic flow diagram of a method for joint coding shown according to an example.

FIG. 2 is a schematic flow diagram of another method for joint coding shown according to an example.

FIG. 3 is a schematic flow diagram of yet another method for joint coding shown according to an example.

FIG. 4 is a schematic flow diagram of still another method for joint coding shown according to an example.

FIG. 5 is a schematic flow diagram of a method for determining in-effect reference signal resources shown according to an example.

FIG. 6 is a schematic flow diagram of another method for determination of in-effect reference signal resources shown according to an example.

FIG. 7 is a schematic flow diagram of yet another method for determining of in-effect reference signal resources shown according to an example.

FIG. 8 is a schematic flow diagram of methods for joint coding and determining in-effect reference signal resources shown according to an example.

FIG. 9 is a block diagram of an apparatus for joint coding shown according to an example.

DETAILED DESCRIPTION

Figure 10:
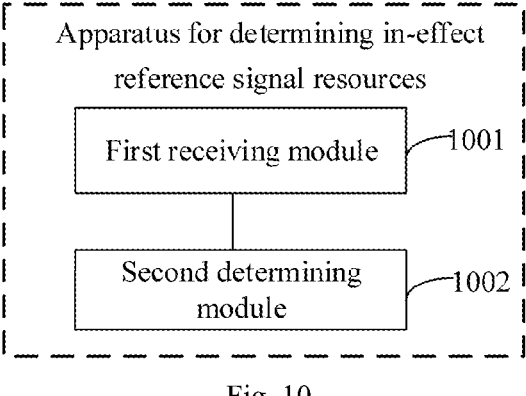
FIG. 10 is a block diagram of an apparatus for determining in-effect reference signal resources shown according to an example.

Examples will be illustrated in detail here, and instances of which are represented in the accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of an apparatus and a method consistent with some aspects of the disclosure as detailed in the appended claims.

The terms used in the disclosure are merely for the purpose of describing the particular examples, and are not intended to limit the disclosure. The singular forms "a", "the" and "this" used in the disclosure and the appended claims are also intended to include the plural forms as well, unless the context clearly indicates otherwise. It should be further understood that the term "and/or" used here refers to and contains any or all possible combinations of one or more associated listed items.

It needs to be understood that the terms "first", "second", "third" and the like may be employed in the disclosure to describe various pieces of information, but these pieces of information should not be limited to these terms. These terms are merely used to distinguish the same type of information from one another. For example, in a case of not departing from the scope of the disclosure, first information may also be called second information, and similarly, the second information may also be called the first information. Depending on the context, the word "if" as used here may be interpreted as "at the time of" or "when" or "in response to determining".

The disclosure relates to the field of communications, in particular to methods and device for joint coding and determining in-effect reference signal resources.

The following is an introduction to a method for joint coding provided in the disclosure. The method for joint coding may be executed by a base station. In the examples of the disclosure, the base station includes, but is not limited to gNB in a new radio (NR) system, eNB in a long-term evolution (LTE) system, or other network side devices used for implementing the base station function, such as a satellite integrated with the base station function in a satellite communication system, which is not limited in the disclosure.

An example of the disclosure provides a method for joint coding. As shown in FIG. 1, FIG. 1 is a flow chart of a method for joint coding shown according to an example, which may be used for a base station. The method may be include the following steps:

in step 101, a first coding value is determined by joint coding on a first indication information, the first indication information is used for indicating in-effect reference signal resources and whether the in-effect reference signal resources are available or unavailable to at least one first beam.

In the example of the disclosure, the first indication information may be used for indicating the in-effect reference signal resources in reference signal (RS) resources configured (which may be pre-configured) by the base station for a terminal, and whether the in-effect reference signal resources are available or unavailable to the at least one first beam.

In step 102, the first coding value is sent.

In the above example, the base station determines a first coding value by performing joint coding on a first indication information, the first indication information is used for indicating in-effect reference signal resources and whether the in-effect reference signal resources are available or unavailable to at least one first beam; sending the first coding value, and sends the obtained first coding value. By means of joint coding, signaling resource overhead is reduced, and indication efficiency of in-effect reference signal resources and whether the in-effect reference signal resources are available to a beam is improved. In particular, when the in-effect reference signal resources are all available to the at least one first beam, sending a bitmap used for indicating whether the in-effect reference signal resources are available to each first beam can be avoided, and resource overhead can be further lowered.

In some optional examples, as shown in FIG. 2, FIG. 2 is a flow chart of a method for joint coding shown according to an example, which may be used for a base station. The method may include the following steps:

In step 201, the number of resources that a first coding value needs to occupy is determined based on the number of reference signal resources configured by the base station for a terminal.

In a possible implementation, when the number of the reference signal resources configured (which may be pre-configured) by the base station for the terminal is 2, the number of the resources occupied by the first coding value may be 3.

In another possible implementation, when the number of the reference signal resources configured by the base station for the terminal is greater than 2, the number of the resources that the first coding value needs to occupy may be expanded, and optionally, it may be greater than 3.

The above is merely an example. When a joint coding mode is used, the number of the resources occupied by the first coding value may also be other numerical values, which is not limited in the disclosure.

In step 202, the first coding value that occupies the number of resources is determined by joint coding on a first indication information.

In step 203, the first coding value is sent.

In the above example, the number of the resources needs to be occupied during joint coding may be determined first, and then the first coding value that occupies the number of resources is determined, which is easy to implement and high in availability.

In some optional examples, in a process of determining the number of resources that the first coding value needs to occupy based on the number of reference signal resources, joint coding may be performed based on the specific content indicated by the first indication information. The specific mode is as follows:

in a first case, the first indication information indicates that each reference signal resource is in effect and the in-effect reference signal resources are all available to the at least one first beam.

In the example of the disclosure, the first beam may be any beam or a beam specified on a network side, which is not limited in the disclosure. In the first case, the first coding value of joint coding is a minimum coding value that occupies the number of resources is determined by the base station.

For example, if the number of the reference signal resources configured by the base station for the terminal is 2, the number of resources occupied by the first coding value may be 3, then the minimum coding value that occupies 3 resources is 000, and the first coding value is also 000 accordingly.

In a second case, the first indication information indicates that no in-effect reference signal resource exists.

Accordingly, the first coding value is a maximum coding value that occupies the number of resources is determined.

For example, if the number of the reference signal resources configured by the base station for the terminal is 2, the number of resources occupied by the first coding value is 3, then the maximum coding value that occupies 3 resources is 111, and the first coding value is also 111 accordingly.

In a third case, the first indication information indicates other information content.

In this case, the first coding value within a range of the minimum coding value to the maximum coding value above is determined.

In a possible implementation, the first indication information indicates that the $n^{th}$ reference signal resource is in effect, and the in-effect reference signal resource is available to the at least one first beam. Where, n may be a positive integer and less than or equal to the number of the reference signal resources configured by the base station for the terminal.

For example, the number of the reference signal resources configured by the base station for the terminal is 2, and the value of n is 1 or 2. When n is 1, the first indication information indicates that the first reference signal resource is in effect, the first reference signal resource is available to the at least one first beam, and the first coding value is 001. When n is 2, the first indication information indicates that the second reference signal resource is in effect, the second reference signal resource is available to the at least one first beam, and the first coding value is 010.

In a possible implementation, the first indication information further indicates that all the reference signal resources are in effect, but the $n^{th}$ in-effect reference signal resource is not available to all the first beams. Where, n may be a positive integer and less than or equal to the number of the reference signal resources configured by the base station for the terminal.

For example, the number of the reference signal resources configured by the base station for the terminal is 2, and the value of n is 1 or 2. When n is 1, the first indication information indicates that all the reference signal resources are in effect, but the first in-effect reference signal resource is not available to all the first beams, accordingly, the first coding value is 011. When n is 2, the first indication information indicates that all the reference signal resources are in effect, but the second in-effect reference signal resource is not available to all the first beams, accordingly, the first coding value is 100.

In a possible implementation, the first indication information further indicates that all the reference signal resources are in effect, but each in-effect reference signal resource is not available to all the first beams.

For example, the number of the reference signal resources configured by the base station for the terminal is 2, the first indication information indicates that all the reference signal resources are in effect, but the first and second in-effect reference signal resources are not available to all the first beams, accordingly, the first coding value is 101.

In another possible implementation, if there are still other coding values that are not used after the above joint coding, other coding values is temporarily reserved.

In the example of the disclosure, by taking an example that the number of the reference signal resources configured by the base station for the terminal is 2, and the number of resources that occupied by the first coding value is 3, a correspondence between the first coding value obtained through joint coding and the first indication information may be shown in Table 1.

TABLE 1

| First coding value | | | First indication information |
|---|---|---|---|
| 0 | 0 | 0 | All reference signal resources are in effect and the in-effect reference signal resources are all available to at least one first beam. |
| 0 | 0 | 1 | The first reference signal resource is in effect, and the in-effect reference signal resource is available to at least one first beam. |
| 0 | 1 | 0 | The second reference signal resource is in effect, and the in-effect reference signal resource is available to at least one first beam. |
| 0 | 1 | 1 | All the reference signal resources are in effect, but the first reference signal resource is not available to all the first beams. |
| 1 | 0 | 0 | All the reference signal resources are in effect, but the second reference signal resource is not available to all the first beams. |
| 1 | 0 | 1 | All the reference signal resources are in effect, but the first and second reference signal resources are not available to all the first beams. |
| 1 | 1 | 0 | Reserved |
| 1 | 1 | 1 | All the reference signal resources are not in effect. |

It can be seen from Table 1 that for a case that all the reference signal resources are in effect and the in-effect reference signal resources are available for the at least one first beam, the base station may indicate by sending fewer first coding values without the need to send a bitmap indicating whether the in-effect reference signal resources are available to each first beam, and the indication efficiency of different in-effect cases of a plurality of reference signal resources may be improved.

The above is merely an example explanation. The joint coding mode used for indicating the in-effect reference signal resources and whether the in-effect reference signal resources are available to the beam should fall within the scope of protection of the disclosure.

In some optional examples, the base station sends a physical layer command or high-level signaling that carries the first coding value after obtaining the first coding value in a joint coding mode.

Optionally, the physical layer command includes, but is not limited to downlink control information (DCI) and system information block (SIB). The high-level signaling includes, but is not limited to a radio resource control (RRC) signaling.

In some optional examples, as shown in FIG. 3, FIG. 3 is a flow chart of a method for joint coding shown according to an example, which may be used for a base station. The method may include the following steps:

In step 301, in a case where the number of resources occupied by a first coding value is greater than a first number, in-effect reference signal resources indicated by first indication information are coded and a second coding value is determined.

The first number is a preset number. The first indication information is used for indicating the in-effect reference signal resources and whether the in-effect reference signal resources are available or unavailable to at least one first beam.

In the example of the disclosure, if the number of the resources occupied by the first coding value obtained through the joint coding mode is large, that is, greater than the first number, some information content in the first indication information is coded.

In a possible implementation, the in-effect reference signal resources indicated by the first indication information may be coded to obtain the second coding value. Thus, the occupation of signaling resources can be reduced, especially the resource occupation of the physical layer command can be reduced.

In step 302, the second coding value is sent.

In the example of the disclosure, the second coding value is sent through the physical layer command or the high-level signaling.

In the above example, the in-effect reference signal resources indicated in the first indication information is coded when using the joint coding mode to occupy too many signaling resources, thus reducing the resource occupation of the signaling.

In some optional examples, as shown in FIG. 4, FIG. 4 is a flow chart of a method for joint coding shown according to an example, which may be used for a base station. The method may include the following steps:

in step 401, a first coding value is determined by performing the joint coding on a first indication information, the first indication information is used for indicating in-effect reference signal resources and whether the in-effect reference signal resources are available or unavailable to at least one first beam.

In step 402, the first coding value is sent.

In step 403, a target bitmap is determined based on second indication information, the second indication information being used for indicating whether the in-effect reference signal resources are available or unavailable to at least one second beam.

In the example of the disclosure, it can be seen from Table 1 above that limitation on the beams in joint coding generally includes two cases: one is in-effect for all the first beams, and the other is not in-effect for all the first beams. There is no indication for other cases. For other cases, for example, if the in-effect reference signal resources are available or unavailable to the second beam, a bitmap mode may be used for indicating. The second beam may be other beams different from the first beam, which is not limited in the disclosure.

Whether the in-effect reference signal resources are available or unavailable to each second beam can be indicated by the target bitmap. In a case that a bit value at a corresponding bit position is a first preset value, such as 1, it may be determined that the in-effect reference signal resources are available to the second beam. In a case that the bit value at the corresponding bit position is a second preset value, such as 0, it may be determined that the in-effect reference signal resources are not available to the second beam.

In step 404, the target bitmap is sent through a radio resource control (RRC) signaling.

In the above example, the target bitmap may be sent through the RRC signaling instead of being configured in DCI to avoid wasting resources of the physical layer command.

The following introduces a method for determination of in-effect reference signal resources provided by the disclosure. The method may be applied to a terminal, including but not limited to a mobile phone, a satellite phone, a wearable device, a tablet computer, a desktop computer, a laptop, etc.

An example of the disclosure provides a method for determining in-effect reference signal resources. As shown in FIG. 5, FIG. 5 is a flow chart of a method for determining in-effect reference signal resources shown according to an example, which is performed by a terminal. The method includes the following steps:

in step 501, a first coding value is received.

In the example of the disclosure, the first coding value is a coding value obtained by joint coding on first indication information, and the first indication information is used for indicating in-effect reference signal resources and whether the in-effect reference signal resources are available or unavailable to at least one first beam.

In step 502, based on the first coding value, the in-effect reference signal resources are determined from reference signal resources configured by a base station for the terminal, and whether the in-effect reference signal resources are available or unavailable to the at least one first beam is determined.

For example, if the first coding value is 000, the terminal determines that two reference signal resources configured by the base station for the terminal are both in effect and available to each first beam.

In the above example, the terminal quickly determines the in-effect reference signal resources based on the first coding value of joint coding, and determines whether the in-effect reference signal resources are available or unavailable to at least one first beam, thus achieving high availability.

In some optional examples, as shown in FIG. 6, FIG. 6 is a flow chart of a method for determining in-effect reference signal resources shown according to an example, which is performed by a terminal. The method includes the following steps:

in step 601, a first coding value is received.

The first coding value is a coding value obtained by joint coding on first indication information, and the first indication information is used for indicating in-effect reference signal resources and whether the in-effect reference signal resources are available or unavailable to at least one first beam.

In step 602, based on the first coding value, the in-effect reference signal resources are determined from reference signal resources configured by a base station for the terminal, and whether the in-effect reference signal resources are available or unavailable to the at least one first beam is determined.

In step 603, a target bitmap is received.

In step 604, whether the in-effect reference signal resources are available or unavailable to at least one second beam is determined based on the target bitmap.

For example, if the target bitmap is 101, the in-effect reference signal resources are available to the 1st and 3rd second beams, but are unavailable to the 2nd second beam.

In the above example, the terminal determines whether the in-effect reference signal is available or unavailable to a second beam outside of joint coding based on the received target bitmap, thus achieving easy implementation and high availability.

In some optional examples, as shown in FIG. 7, FIG. 7 is a flow chart of a method for determining in-effect reference signal resources shown according to an example, which is performed by a terminal. The method includes the following steps:

in step 701, a second coding value is received, the second coding value is a coding value obtained by coding in-effect reference signal resources indicated by first indication information.

The first indication information indicates the in-effect reference signal resources and whether the in-effect reference signal resources are available or unavailable to at least one first beam.

In step 702, based on the second coding value, the in-effect reference signal resources are determined from reference signal resources configured by a base station for the terminal.

In the above example, the terminal quickly determines the in-effect reference signal resources according to the received second coding value, thus achieving easy implementation and high availability.

In some optional examples, as shown in FIG. 8, FIG. 8 is a flow chart of methods for joint coding and determining in-effect reference signal resources shown according to an example. The method includes the following steps:

in step 801, a base station determines a first coding value by performing the joint coding on first indication information, where the first indication information is used for indicating in-effect reference signal resources and whether the in-effect reference signal resources are available or unavailable to at least one first beam.

In step 802, the base station sends the first coding value.

In step 803, a terminal determines, based on the first coding value, the in-effect reference signal resources from reference signal resources configured by the base station for the terminal, and determines whether the in-effect reference signal resources are available or unavailable to the at least one first beam.

In the above example, the base station joint codes on the first indication information used for indicating the in-effect reference signal resources and whether the in-effect reference signal resources are available or unavailable to the at least one first beam, and sends the first coding value. The terminal quickly determines the in-effect reference signal resources according to the first coding value, and determines whether the in-effect reference signal resources are available or unavailable to at least one first beam. By means of joint coding in the disclosure, signaling resource overhead is reduced, and indication efficiency of in-effect reference signal resources and whether the in-effect reference signal resources are available to a beam is improved. In particular, when the in-effect reference signal resources are all available to the at least one first beam, sending a bitmap used for indicating whether the in-effect reference signal resources are available to each first beam can be avoided, and resource overhead can be further lowered.

Corresponding to the aforementioned examples of application function implementation methods, the disclosure further provides examples of application function implementation apparatuses.

Referring to FIG. 9, FIG. 9 is a block diagram of an apparatus for joint coding shown according to an example. The apparatus is used for a base station and includes:

a first determining module 901, configured to determining a first coding value by performing the joint coding on a first indication information, wherein the first indication information is used for indicating in-effect reference signal resources and whether the in-effect reference signal resources are available or unavailable to at least one first beam; and a sending module 902, configured to send the first coding value.

Referring to FIG. 10, FIG. 10 is a block diagram of an apparatus for determining in-effect reference signal resources shown according to an example. The apparatus is used for a terminal and includes:

a first receiving module 1001, configured to receive a first coding value, the first coding value is a coding value determined by joint coding on first indication information, and the first indication information is used for indicating in-effect reference signal resources and whether the in-effect reference signal resources are available or unavailable to at least one first beam; and a second determining module 1002, configured to determine, the in-effect reference signal resources from reference signal resources configured by a base station for the terminal, and determining whether the in-effect reference signal resources are available or unavailable to the at least one first beam based on the first coding value.

Figure 11:
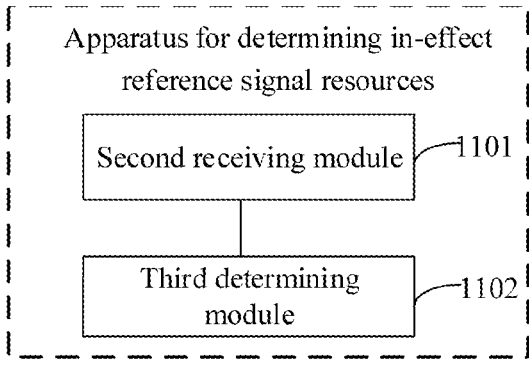
FIG. 11 is a block diagram of another apparatus for determining in-effect reference signal resources shown according to an example.

Referring to FIG. 11, FIG. 11 is a block diagram of an apparatus for determining in-effect reference signal resources shown according to an example. The apparatus is used for a terminal and includes:

a second receiving module 1101, configured to receive a second coding value, the second coding value is a coding value determined by coding in-effect reference signal resources indicated by first indication information, and the first indication information is used for indicating the in-effect reference signal resources and whether the in-effect reference signal resources are available or unavailable to at least one first beam; and a third determining module 1102, configured to determine, based on the second coding value, the in-effect reference signal resources from reference signal resources configured by a base station for the terminal.

As for the apparatus examples, since they basically correspond to the method examples, relevant parts may refer to the partial illustration in the method examples. The apparatus examples described above are merely schematic. The above units described as separate parts may be or may not be physically separated, and the parts displayed as units may be or may not be physical units, that is, they may be located in one place or distributed onto a plurality of network units. Part or all of the modules may be selected according to actual needs to implement the objectives of the solutions of the disclosure. Those ordinarily skilled in the art may understand and implement without creative effort.

Accordingly, the disclosure further provides a base station for joint coding, including:

a processor; and a memory for storing executable instructions of the processor, where the processor is configured to execute the method for joint coding described in any one above.

Figure 12:
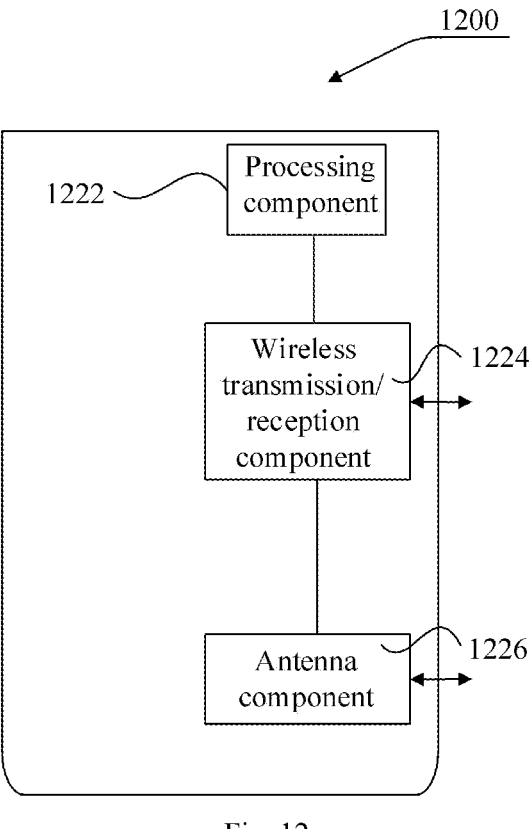
FIG. 12 is a schematic structural diagram of an apparatus for joint coding shown by the disclosure according to an example.

As shown in FIG. 12, FIG. 12 is a schematic structural diagram of a device 1200 for joint coding shown according to an example. The device 1200 provided as a base station. Referring to FIG. 12, the device 1200 includes a processing component 1222, a wireless transmission/reception component 1224, an antenna component 1226, and a signal processing section unique to a wireless interface. The processing component 1222 further includes one or more processors.

One of processors of the processing component 1222 is configured to execute the method for joint coding described in any one above.

Accordingly, the disclosure further provides a terminal for determining in-effect reference signal resources, including:

a processor; and a memory for storing executable instructions of the processor, where the processor is configured to execute the method for determining the in-effect reference signal resources described in any one above.

Figure 13:
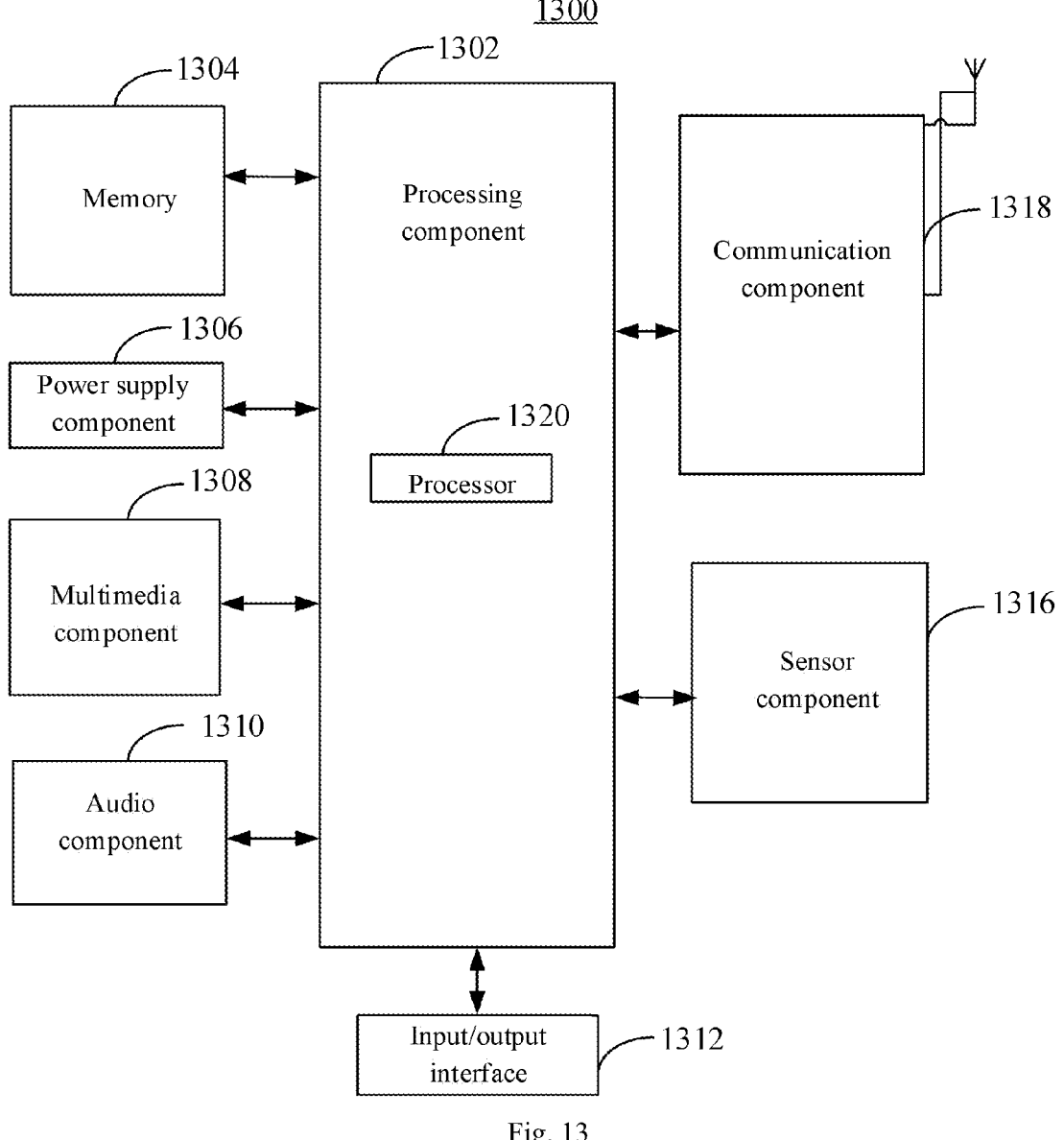
FIG. 13 is a schematic structural diagram of an apparatus for determining in-effect reference signal resources shown by the disclosure according to an example.

FIG. 13 is a block diagram of an electronic device 1300 shown according to an example of the disclosure. For example, the electronic device 1300 may be a mobile phone, a tablet computer, an e-book reader, a multimedia playback device, a wearable device, a vehicle terminal, an ipad, a smart television, and other terminals.

Referring to FIG. 13, the electronic device 1300 may include one or more of the following components: a processing component 1302, a memory 1304, a power supply component 1306, a multimedia component 1308, an audio component 1310, an input/output (I/O) interface 1312, a sensor component 1316, and a communication component 1318.

The processing component 1302 usually controls overall operation of the electronic device 1300, such as operations associated with display, telephone calling, data communication, a camera operation and a record operation. The processing component 1302 may include one or more processors 1320 to execute an instruction, so as to complete all or part of steps of the above method for determination of the in-effect reference signal resources. In addition, the processing component 1302 may include one or more modules, so as to facilitate interaction between the processing component 1302 and other components. For example, the processing component 1302 may include a multimedia module, so as to facilitate interaction between the multimedia component 1308 and the processing component 1302. For another example, the processing component 1302 may read executable instructions from a memory to implement the steps of the method for determination of in-effect reference signal resources provided by the above examples.

The memory 1304 is configured to store various types of data so as to support operations on the electronic device 1300. Examples of these data include instructions of any application programs or methods configured to be operated on the electronic device 1300, contact data, telephone directory data, messages, pictures, videos, and the like. The memory 1304 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1306 provides electric power for various components of the electronic device 1300. The power supply component 1306 may include a power management system, one or more power sources, and other components associated with generating, managing and distributing electric power for the electronic device 1300.

The multimedia component 1308 includes a display screen providing an output interface between the electronic device 1300 and a user. In some examples, the multimedia component 1308 includes a front camera and/or a back camera. When the electronic device 1300 is in an operation mode, such as a shooting mode or a video mode, the front camera and/or the back camera may receive external multimedia data. Each front camera and each back camera may be a fixed optical lens system or have a focal length and optical zooming capability.

The audio component 1310 is configured to output and/or input an audio signal. For example, the audio component 1310 includes a microphone (MIC). When the electronic device 1300 is in the operation mode, such as a call mode, a recording mode or a speech recognition mode, the microphone is configured to receive an external audio signal. The received audio signal may be further stored in the memory 1304 or sent via the communication component 1318. In some examples, the audio component 1310 further includes a speaker for outputting the audio signal.

The I/O interface 1312 provides an interface between the processing component 1302 and a peripheral interface module, and the above peripheral interface module may be a keyboard, a click wheel, buttons, etc. These buttons may include but are not limited to: a home button, a volume button, a start button and a lock button.

The sensor component 1316 includes one or more sensors for providing state evaluations of all aspects for the electronic device 1300. For example, the sensor component 1316 may detect a start/shutdown state of the electronic device 1300 and relative positioning of components, for example, the components are a display and a keypad of the electronic device 1300. The sensor component 1316 may further detect position change of the electronic device 1300 or one component of the electronic device 1300, whether there is contact between the user and the electronic device 1300, azimuth or speed up/speed down of the electronic device 1300, and temperature change of the electronic device 1300. The sensor component 1316 may include a proximity sensor, which is configured to detect existence of a nearby object without any physical contact. The sensor component 1316 may further include an optical sensor, such as a CMOS or CCD image sensor, for use in an imaging application. In some examples, the sensor component 1316 may further include an acceleration sensor, a gyroscope sensor, a magnetic sensor, a pressure sensor or a temperature sensor.

The communication component 1318 is configured to facilitate wired or wireless communication between the electronic device 1300 and other devices. The electronic device 1300 may access into a wireless network based on a communication standard, such as Wi-Fi, 2G, 3G, 4G or 5G, or their combinations. In one example, the communication component 1318 receives a broadcast signal or broadcast related information from an external broadcast management system via a broadcast channel. In an example, the communication component 1318 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the electronic device 1300 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method for determination of in-effect reference signal resources.

In the example, a non-transitory machine readable storage medium including instructions is further provided, such as a memory 1304 including instructions. The above instructions may be executed by a processor 1320 of an electronic device 1300 so as to complete the above method for determination of the in-effect reference signal resources. For example, the non-temporary computer readable storage medium may be an ROM, a random access memory (RAM), a CD-ROM, a magnetic tape, a floppy disk, an optical data storage device and the like.

Those of skill in the art will easily figure out other implementation solutions of the disclosure after considering the specification and practicing the invention disclosed here. The disclosure intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claims.

It is to be understood that the disclosure is not limited to the exact structure that has been described above and shown in the accompanying drawings, and that various modifications and changes may be made without departing from the scope of the disclosure. The scope of the disclosure is limited merely by the appended claims.

The invention claimed is:

1. A method for joint coding, performed by a base station, and comprising:

determining a first coding value by performing joint coding on a first indication information, wherein the first indication information is used for indicating in-effect reference signal resources and whether the in-effect reference signal resources are available or unavailable to at least one first beam; and sending the first coding value;

wherein determining the first coding value by performing the joint coding on the first indication information comprises:

determining a number of resources that the first coding value needs to occupy based on a number of reference signal resources configured by the base station for a terminal; and determining the first coding value that occupies the number of resources by performing the joint coding on the first indication information.

2. The method according to claim 1, wherein determining the first coding value that occupies the number of resources by performing the joint coding on the first indication information comprises:

determining, in a case where the first indication information indicates that each reference signal resource is in effect and the in-effect reference signal resources are all available to the at least one first beam, the first coding value as a minimum coding value that occupies the number of resources.

3. The method according to claim 1, wherein sending the first coding value comprises:

sending a physical layer command or high-level signaling that carries the first coding value.

4. The method according to claim 1, further comprising:

determining a second coding value, in a case where a number of resources occupied by the first coding value is greater than a first number, by coding the in-effect reference signal resources indicated by the first indication information;

sending the second coding value.

5. The method according to claim 1, further comprising:

determining a target bitmap based on second indication information, the second indication information is used for indicating whether the in-effect reference signal resources are available or unavailable to at least one second beam; and sending the target bitmap through a radio resource control (RRC) signaling.

6. The method according to claim 1, wherein determining the first coding value that occupies the number of resources by performing the joint coding on the first indication information comprises:

determining, in a case where the first indication information indicates that no in-effect reference signal resource exists, the first coding value as a maximum coding value that occupies the number of resources.

7. The method according to claim 1, wherein determining the first coding value that occupies the number of resources by performing the joint coding on the first indication information comprises:

determining, in a case where the first indication information indicates other information content, the first coding value within a range of a minimum coding value to a maximum coding value.

8. A method for determining in-effect reference signal resources, performed by a terminal, and comprising:

receiving a first coding value, wherein the first coding value is a coding value determined by performing joint coding on first indication information by a base station, the first indication information is used for indicating in-effect reference signal resources and whether the in-effect reference signal resources are available or unavailable to at least one first beam, and the first coding value is determined by the base station by: determining a number of resources that the first coding value needs to occupy based on a number of reference signal resources configured by the base station for a terminal; and determining the first coding value that occupies the number of resources by performing the joint coding on the first indication information; and determining, the in-effect reference signal resources from reference signal resources configured by the base station for the terminal, and determining whether the in-effect reference signal resources are available or unavailable to the at least one first beam based on the first coding value.

9. The method according to claim 8, further comprising:

receiving a target bitmap;

determining whether the in-effect reference signal resources are available or unavailable to at least one second beam based on the target bitmap.

10. A method for determining in-effect reference signal resources, performed by a terminal, and comprising:

receiving a second coding value, wherein the second coding value is a coding value determined by coding in-effect reference signal resources indicated by first indication information, the first indication information is used for indicating the in-effect reference signal resources and whether the in-effect reference signal resources are available or unavailable to at least one first beam, the second coding value is determined and sent, in a case where a number of resources occupied by a first coding value is greater than a first number, by coding the in-effect reference signal resources indicated by the first indication information by a base station, and the first coding value is determined by performing joint coding on a first indication information by the base station; and determining, based on the second coding value, the in-effect reference signal resources from reference signal resources configured by the base station for the terminal;

wherein the first coding value is determined by:

determining a number of resources that the first coding value needs to occupy based on a number of reference signal resources configured by the base station for a terminal; and determining the first coding value that occupies the number of resources by performing the joint coding on the first indication information.

11. A base station, comprising:

a processor; and a memory for storing executable instructions of the processor, wherein the processor is configured to execute the method for joint coding according to claim 1.

12. The base station according to claim 11, wherein the processor is configured to:

determine, in a case where the first indication information indicates that each reference signal resource is in effect and the in-effect reference signal resources are all available to the at least one first beam, the first coding value as a minimum coding value that occupies the number of resources; and/or determine, in a case where the first indication information indicates that no in-effect reference signal resource exists, the first coding value as a maximum coding value that occupies the number of resources; and/or determine, in a case where the first indication information indicates other information content, the first coding value within a range of the minimum coding value to the maximum coding value.

13. The base station according to claim 11, wherein the processor is configured to:

send a physical layer command or high-level signaling that carries the first coding value.

14. The base station according to claim 11, wherein the processor is configured to:

determine a second coding value, in a case where the number of resources occupied by the first coding value is greater than a first number, by coding the in-effect reference signal resources indicated by the first indication information;

send the second coding value.

15. The base station according to claim 11, wherein the processor is configured to:

determine a target bitmap based on second indication information, the second indication information is used for indicating whether the in-effect reference signal resources are available or unavailable to at least one second beam; and send the target bitmap through a radio resource control (RRC) signaling.

16. A terminal, comprising:

a processor; and a memory for storing executable instructions of the processor; wherein the processor is configured to execute the method for determining the in-effect reference signal resources according to claim 8.

17. The terminal according to claim 16, wherein the processor is configured to:

receive a target bitmap;

determine whether the in-effect reference signal resources are available or unavailable to at least one second beam based on the target bitmap.

18. A terminal, comprising:

a processor; and a memory for storing executable instructions of the processor; wherein the processor is configured to execute the method for determining the in-effect reference signal resources according to claim 10.

* * * * *